United States Patent [19]
Tomimitsu et al.

[11] Patent Number: 5,943,737
[45] Date of Patent: Aug. 31, 1999

[54] DOOR GRIP STRUCTURE FOR VEHICLES

[75] Inventors: Tsutomu Tomimitsu, Wako; Hiroyuki Kawanishi; Yasushi Fujii, both of Fujisawa, all of Japan

[73] Assignees: Honda Giken Kogyo Kabushiki Kaisha; Isuzu Motors Limited, both of Tokyo, Japan

[21] Appl. No.: 08/906,911

[22] Filed: Aug. 6, 1997

[30] Foreign Application Priority Data

Aug. 7, 1996 [JP] Japan .................................. 8-208347

[51] Int. Cl.⁶ ...................................................... A47B 95/02
[52] U.S. Cl. ................ 16/111 R; 16/110 R; 16/DIG. 18; 16/DIG. 19; 296/146.6; 296/153
[58] Field of Search .............................. 16/111 R, 110 R, 16/114, DIG. 12, DIG. 18, DIG. 19, DIG. 24; 49/501, 502, 460; 292/336.3; 296/146.1–146.9, 153, 71, 183

[56] References Cited

U.S. PATENT DOCUMENTS

| 4,686,741 | 8/1987 | Moore et al. | 16/112 |
|---|---|---|---|
| 4,745,656 | 5/1988 | Revlett | 16/110 R |
| 4,883,296 | 11/1989 | Laurie | 292/336.3 |
| 4,949,508 | 8/1990 | Elton | 296/146 |
| 5,180,089 | 1/1993 | Suman et al. | 296/153 |
| 5,536,060 | 7/1996 | Rashid et al. | 296/146.6 |

FOREIGN PATENT DOCUMENTS 7-77769   8/1995   Japan .

*Primary Examiner*—Chuck Y. Mah
*Attorney, Agent, or Firm*—Armstrong, Westerman, Hattori, McLeland & Naughton

[57] ABSTRACT

A door grip structure includes a door lining applied to a door panel of a vehicular door. The door lining is provided with an integrally formed grip inner (i.e., formed in a unitary body therewith). The grip inner is fixed to the door panel by screwing two bolts which are inserted through the upper and lower portions of the grip inner, to the door panel. The bolts are covered so that they cannot be seen, by fixing a grip outer to the outer surface of the grip inner. The door grip structure of the present invention both secures rigidity of the vehicular door grip and improves the external appearance of the door grip.

2 Claims, 7 Drawing Sheets

DOOR GRIP STRUCTURE FOR VEHICLES

BACKGROUND OF THE INVENTION

1. Field of the Invention

This invention generally relates to a structure of a door grip provided on a door lining of a vehicle.

2. Description of the Related Art

In general, a door grip provided on a door lining of a vehicle is divided in two, i.e. a grip inner and a grip outer, and employs the following two kinds of fixing structures. First, a grip inner is formed separately from a door lining, and the grip inner and door lining are fixed together to a door panel by bolts, a grip outer being then fixed so as to cover an interior-side side surface of the grip inner. Second, a door lining having a grip outer formed into a unitary body therewith is fixed to a door panel by bolts, and a grip inner is then fixed so as to cover a door panel-side side surface of the grip outer.

When the first structure above is employed, the bolts by which the grip inner and door lining are fixed together to the door panel are covered with the grip outer, so that the bolts become unable to be seen from the interior of a vehicle. Accordingly, the external appearance of the door grip structure is improved. However, since the grip inner and grip outer are separately formed members with respect to the door lining, it is difficult to increase the rigidity of the door grip fixing structure.

When the second structure above is employed, the securing of the rigidity of the door grip and the reducing of the number of parts can be done since the grip outer and door lining are formed into a unitary body. However, the head portions of the bolts by which the door lining is fixed to the door panel are exposed to the interior of a vehicle. Therefore, it is necessary to cover the bolt holes with hole lids and thus prevent the deterioration of the external appearance of the door grip structure, and, moreover, the bolts cannot be arranged in desirable positions in some cases since the positions in which the hole lids are provided are restricted. As described in, especially, Japanese Patent Publication No. 7-77769, the manufacturing steps increase greatly in a door grip structure formed by molding a unitary door lining having a portion projecting toward the interior of a vehicle body, providing a hollow space, into which a grip outer and a hand of an occupant are to be inserted, by cutting off a part of the projecting portion, and then closing an opening of the cut portion with an additional member corresponding to a grip inner.

SUMMARY OF THE INVENTION

It is an object of the present invention to solve the above-described problems in the prior art.

It is another object of the present invention to improve the rigidity of a door grip for vehicles and to reduce the number of parts involved, while improving the external appearance thereof.

Objects of the present invention are achieved by providing a door grip structure for a vehicle with a door panel, the door grip structure including a door lining having an integrally formed grip inner, a grip outer fixed to an interior-side surface of the grip inner and covering fasteners attaching the door lining to the door panel through the grip inner.

BRIEF DESCRIPTION OF THE DRAWINGS

These and other objects and advantages of the invention will become apparent and more readily appreciated from the following description of the preferred embodiment, taken in conjunction with the accompanying drawings of which.

DETAILED DESCRIPTION OF THE PREFERRED EMBODIMENT

Figure 1:
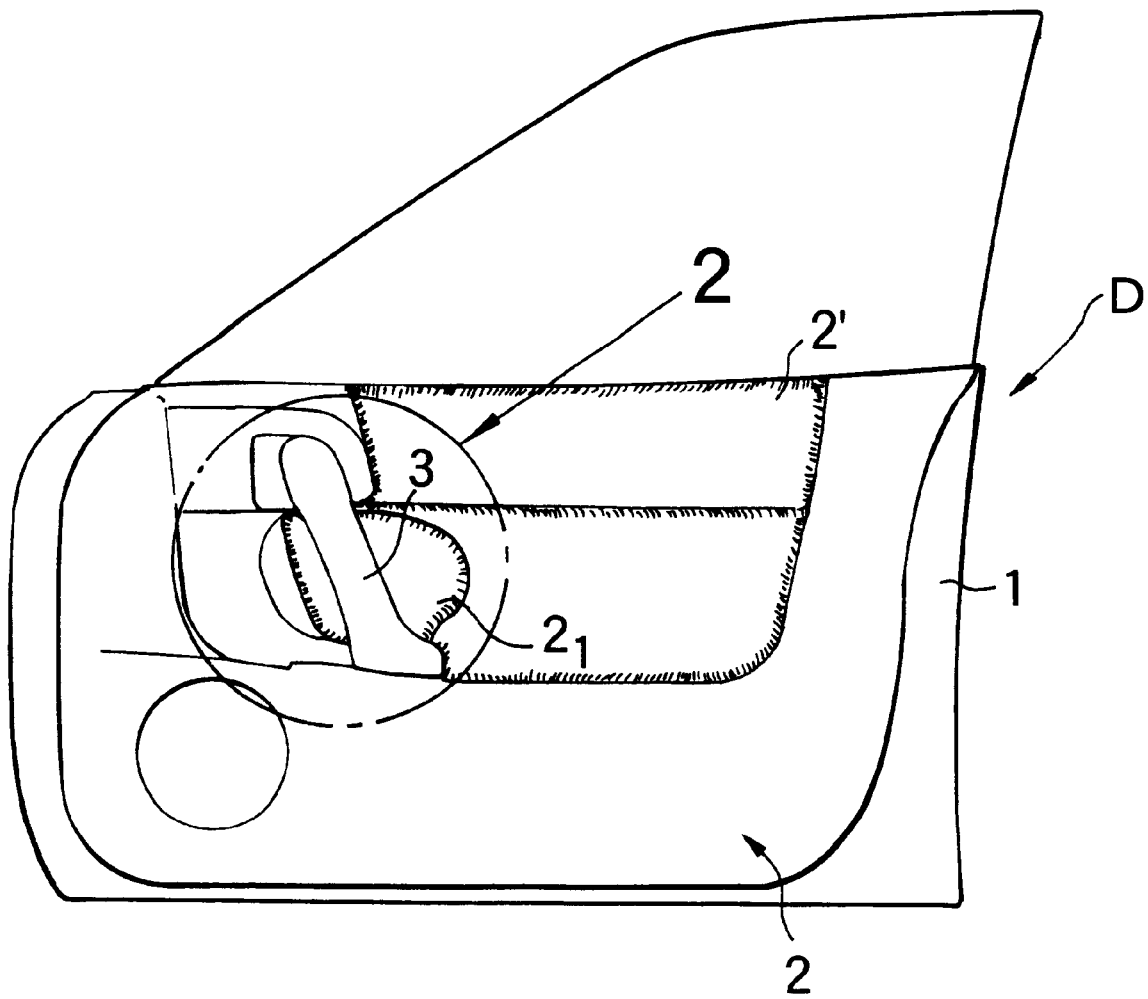
FIG. 1 is a drawing showing the side surface of a door for a vehicle which is on the side of the interior of the vehicle.

Reference will now be made in detail to the preferred embodiment of the present invention, illustrated in the accompanying drawings FIGS. 1 to 8, wherein like reference numerals refer to like elements throughout.

FIG. 1 shows a front right door D of a car which is formed by pasting a door lining 2 of a synthetic resin on an interior-side side surface of a door panel 1 of steel. The door lining 2 is provided with a door grip 3 which is held by the hand of an occupant in the interior of the car when the occupant opens or closes the door D.

Figure 2:
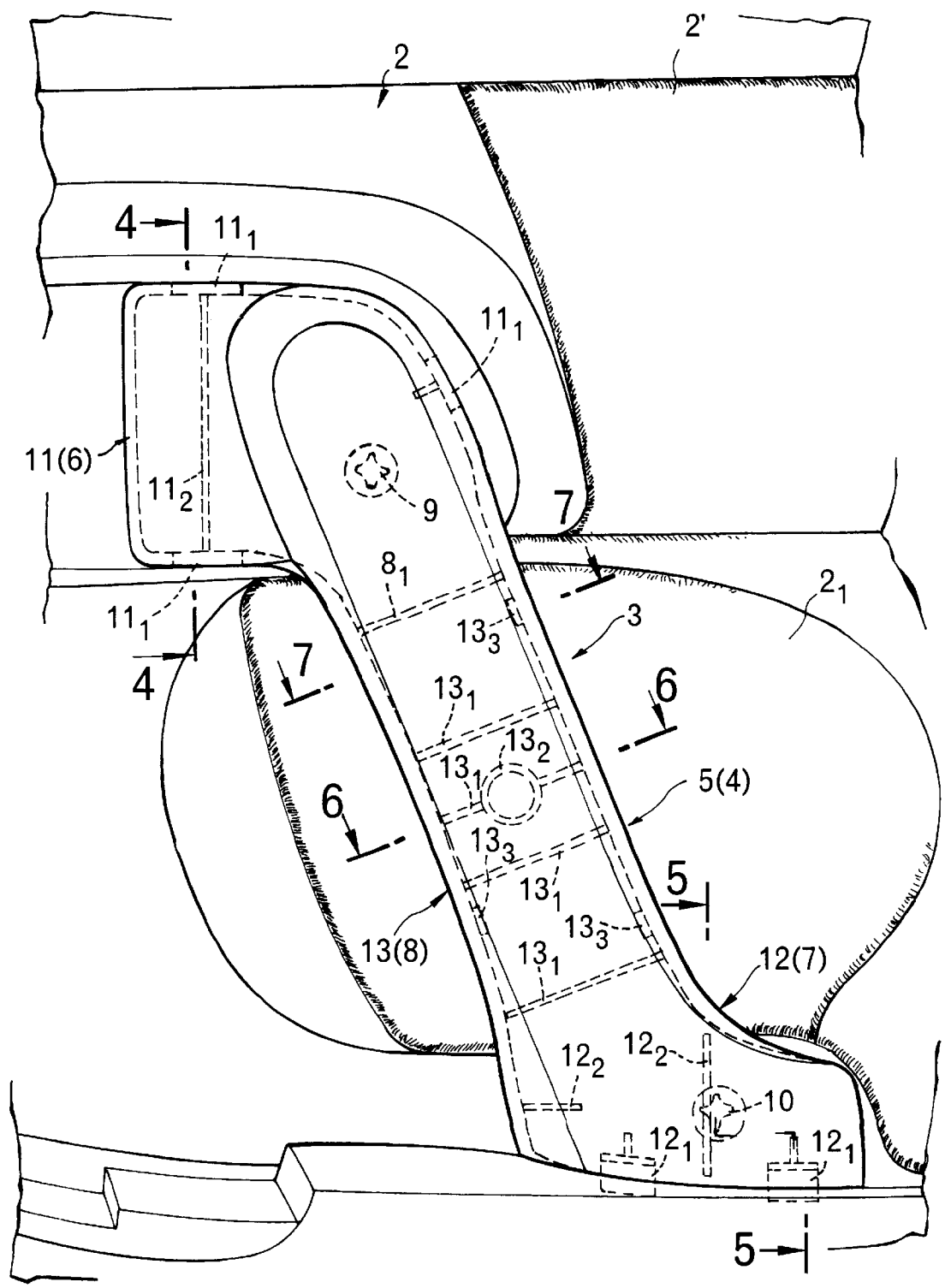
FIG. 2 is an enlarged view of a part designated by a reference numeral 2 in FIG. 1.
Figure 3:
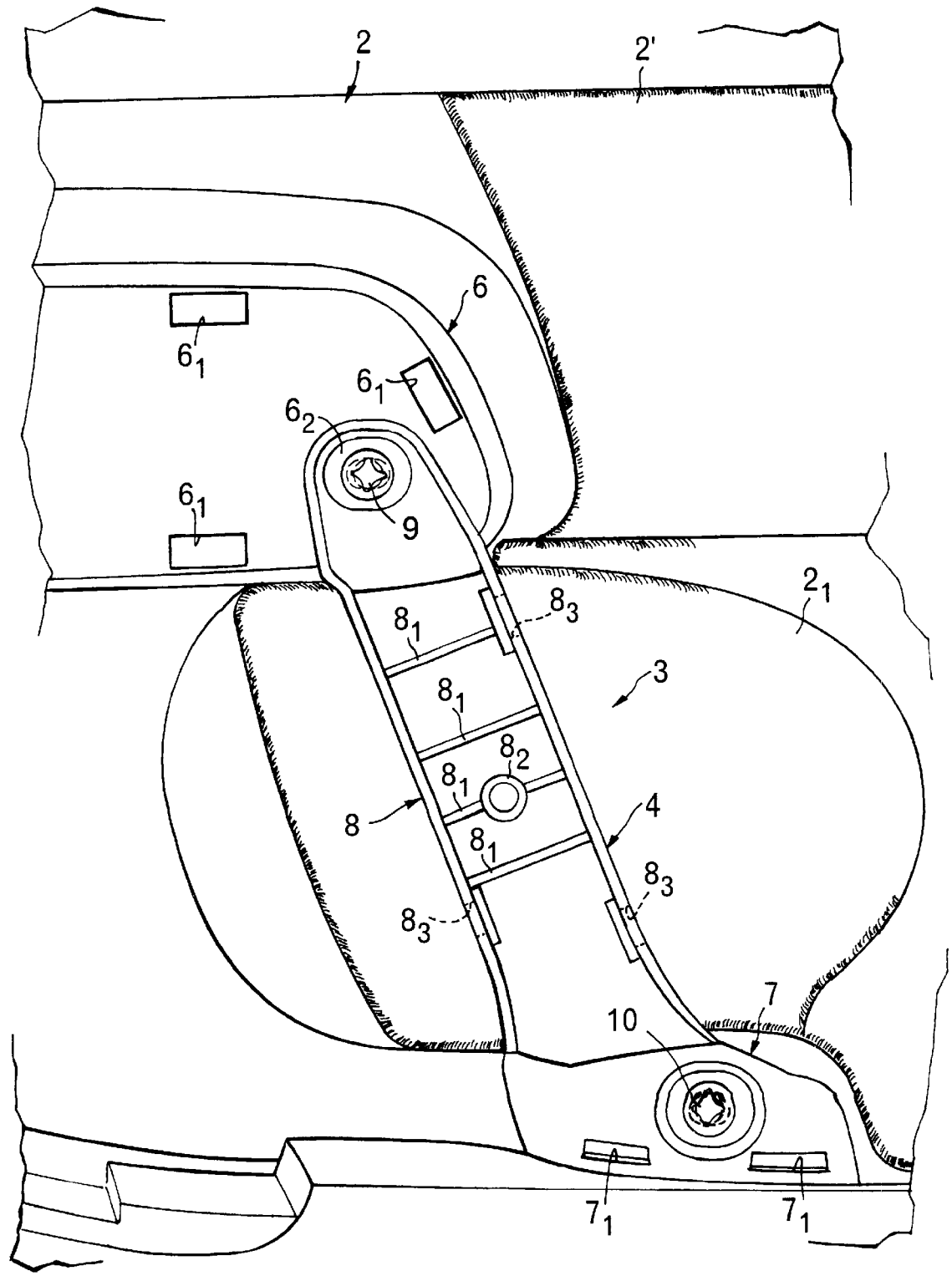
FIG. 3 is a drawing showing what is shown in FIG. 2 with a grip outer removed therefrom.
Figure 8:
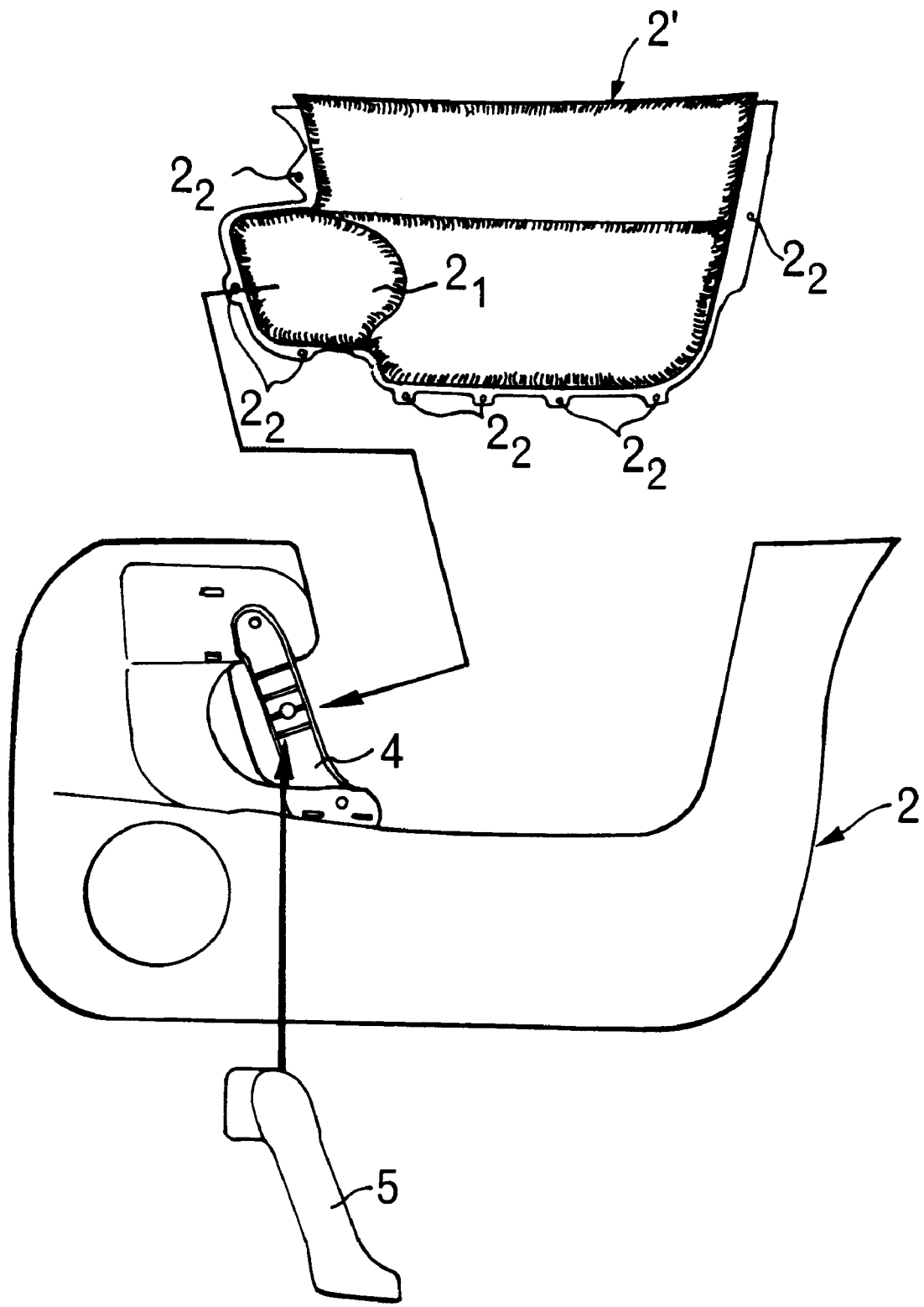
FIG. 8 is an exploded view in perspective of a door lining, a cloth-pasted panel and a grip outer.

As is clear from a combination of FIGS. 2, 3 and 8, a part of the door lining 2 is cut off, and a cloth-pasted panel 2' having a cloth on the outer side is fixed on the cut-off portion of the door lining 2. The door grip 3 comprises a grip inner 4 formed into a unitary body with the door lining 2 so as to extend across the cut-off portion, and a grip outer 5 fixed on the outer surface (interior-side surface) of the grip inner 4. The grip inner 4 is joined in a unitary condition at base portions 6, 7, which are provided at the upper and lower sides thereof, to the door lining 2. In order to provide a grip body 8, which extends between the two base portions 6, 7, with a hollow space into which the hand of an occupant is to be inserted, a recess 21 is formed in the portion of the cloth-pasted panel 2' which is opposed to the grip inner 4.

The cloth-pasted panel 2' is fixed on the door lining 2 by fitting a plurality of pins $2_3$(refer to FIG. 5), which are provided on a peripheral part of the cut-off portion of the door lining 2, into a plurality of holes $2_2$(refer to FIGS. 5 and 8) formed in a peripheral portion of the cloth-pasted panel 2', and then thermally fusing the former to the latter. The door lining 2 is fixed to the door panel 1 by a plurality of bolts, one bolt 9 of which is screwed to the door panel 1 through the upper base portion 6 of the grip inner 4, and another bolt 10 of which is screwed to the door panel 1 through the lower base portion 7 of the grip inner 4.

The upper base portion 6 of the grip inner 4 is provided with three locking holes 6, and a fixing boss $6_2$ through which the bolt 9 is inserted, while the lower base portion 7 of the grip inner 4 is provided with two locking holes $7_1$ and a fixing boss $7_2$ through which the bolt 10 is inserted. A body 8 of the grip inner 4 is provided with four reinforcing ribs $8_1$, an annular positioning boss $8_2$ and three locking recesses $8_3$.

The grip outer 5 has an upper base portion 11, a lower base portion 12 and a grip body 13 which correspond to the upper and lower base portions 6, 7 and grip body 8 of the grip inner 4. The upper base portion 11 of the grip outer 5 is provided with three locking projections 11$_1$ and one reinforcing rib 11$_2$, and the lower base portion 12 of the grip outer 5 two locking projections 12$_1$ and two reinforcing ribs 12$_2$. The body 13 of the grip outer 5 is provided with four reinforcing ribs 13$_1$, an annular positioning boss 13$_2$ and three locking projections 13$_3$.

Figure 5:
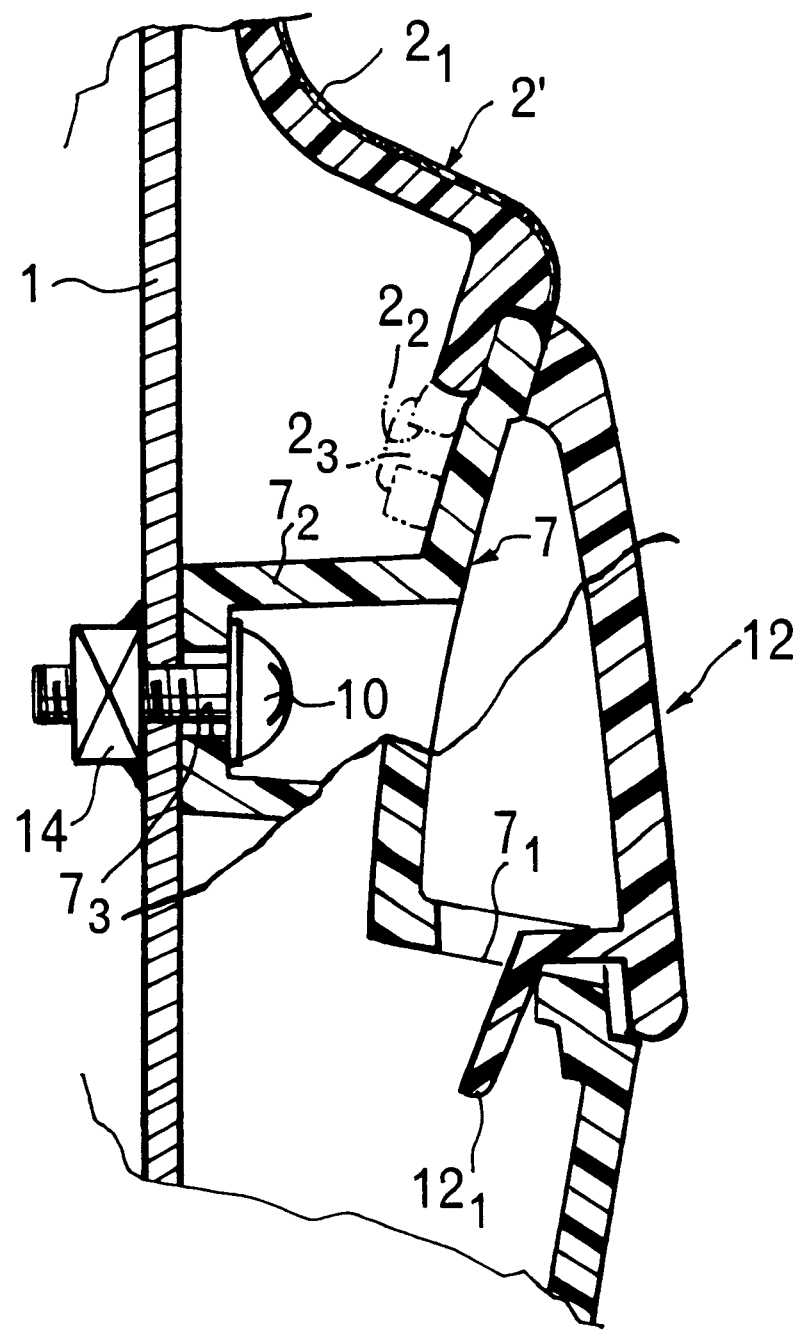
FIG. 5 is a sectional view taken along the line 5—5 in FIG. 2.

As is clear from FIG. 5, the bolt 10 inserted through a through hole 7$_3$ of the fixing boss 7$_2$ provided on the lower base portion 7 of the grip inner 4 is passed through the door panel 1 and engaged with a welding nut 14. The fixing boss 6$_2$ on the upper base portion 6 of the grip inner 4 is also fixed to the door panel 1 by the bolt 9 in the same manner as mentioned above. The door lining 2 having the grip inner 4 in a united condition is fixed to the door panel 1 by a plurality of bolts (not shown) besides the two bolts 9, 10 inserted through the grip inner 4.

Figure 4:
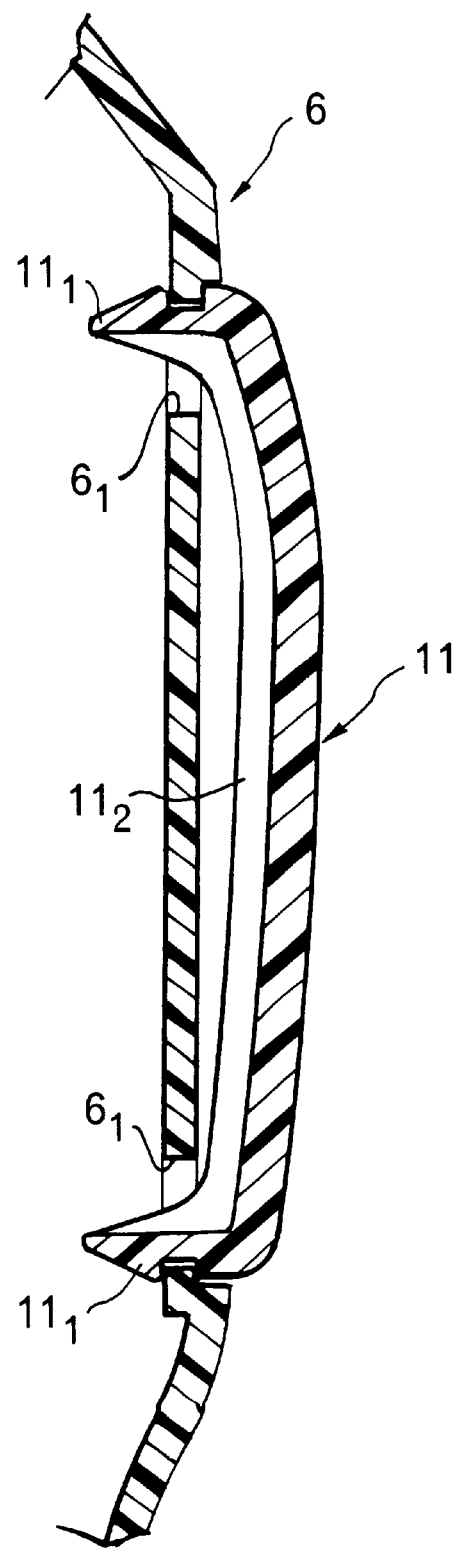
FIG. 4 is a sectional view taken along the line 4—4 in FIG. 2.
Figure 6:
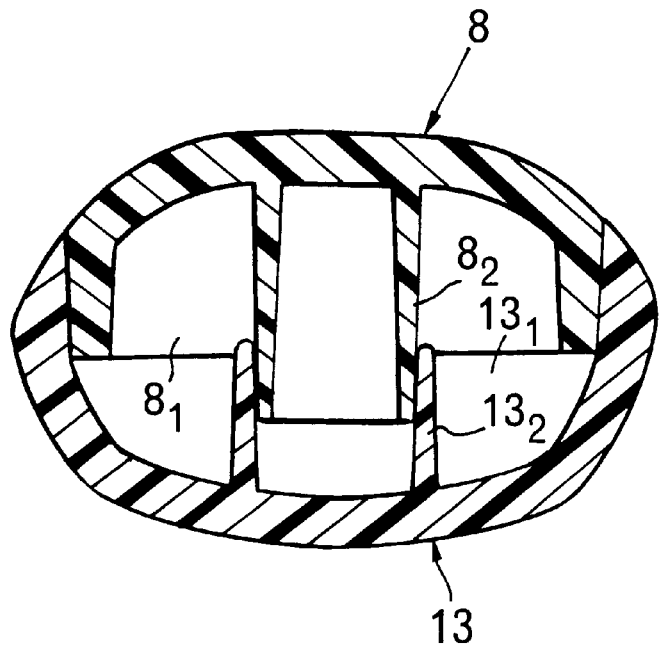
FIG. 6 is a sectional view taken along the line 6—6 in FIG. 2.
Figure 7:
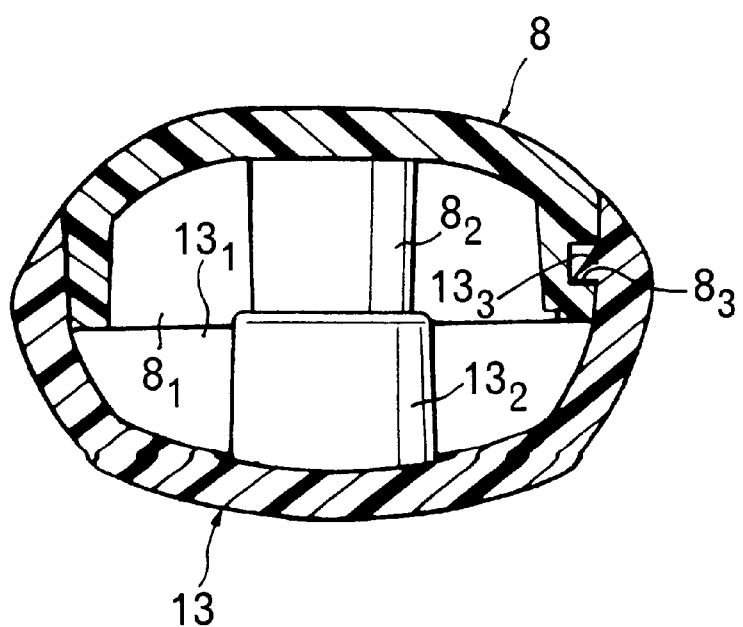
FIG. 7 is a sectional view taken along the line 7—7 in FIG. 2.

When the grip outer 5 is fixed on the outer side of the grip inner 4, the three locking projections 11$_1$ of the upper base portion 11 of the grip outer 5 engage the three locking holes 6$_1$ of the upper base portion 6 of the grip inner 4 as shown in FIG. 4, while the two locking projections 12$_1$ of the lower base portion 12 of the grip outer 5 engage the two locking holes 7$_1$ of the lower base portion 7 of the grip inner 4 as shown in FIG. 5. As shown in FIGS. 6 and 7, the grip outer 5 and grip inner 4 are combined together with both side edge portions of the body 13 of the grip outer 5 fitted on the outer surfaces of both side edge portions of the body 8 of the grip inner 4 and with the three locking projections 13$_3$ of the body 13 of the grip outer 5 engaged with the three locking recesses 8$_3$ in the body 8 of the grip inner 4. During this time, the positioning boss 13$_2$ of the grip body 13 is fitted around the outer circumferential surface of the positioning boss 8$_2$ of the grip body 8, whereby the relative displacement of the two grip bodies is restrained, while the three reinforcing ribs 8$_1$ of the grip body 8 engage the three reinforcing ribs 13$_1$ of the grip body 13, whereby the rigidity of the door grip 3 with respect to a load imparted thereto is heightened.

Since the grip inner 4 and door lining 2 are formed in a united condition, not only the reduction of the number of parts but also the increasing of the rigidity of the door grip 3 including the grip inner 4 can be effected as compared with a case where the grip inner and door lining are formed of different members. Since the head portions of the bolts 9, 10 inserted through the two fixing bosses 6$_1$, 7$_1$ of the grip inner 4 are covered with the grip outer 5, they can be set unable to be seen from the inner side of a vehicle body without using any special members, such as hole lids, and this enables the appearance of the door grip to be improved. Moreover, the rigidity of the door grip 3 can be improved by arranging the bolts 9, 10 in positions desirable for improving the strength thereof.

According to the present invention, and described above, the door grip provided on the door lining covering the surface of the door panel which is on the side of the interior of a vehicle comprises a grip inner formed in a united state with the door lining, and a grip outer fixed to the side surface of the grip inner which is on the side of the interior of the vehicle, and the means for fixing the door lining to the door panel through the grip inner is covered with the grip outer. This enables the rigidity of the door grip to be improved, and the number of parts to be reduced. Moreover, the external appearance of the door grip is improved since the means for fixing the door lining to the door panel become unseen due to the grip outer.

The above is a detailed description of a preferred embodiment of the present invention. However, the present invention is not limited to the preferred embodiment described above. Various alterations in design can be made without departing from the gist of the present invention. For instance, although the bolts 9, 10 are used as fixing means in the embodiment, some other means, for example, such as clips can also be used instead of the bolts 9, 10.

Furthermore, although a preferred embodiment of the present invention has been described, it would be appreciated by those skilled in the art that changes may be made in these embodiments without departing from the principles and spirit of the invention, the scope of which is defined in the claims and their equivalents.

What is claimed is:

1. A door grip structure for a vehicle with a door panel, comprising:

a door lining adapted to cover an interior-side surface of the door panel, said door lining being molded to include a grip inner;

a grip outer fixed to an interior-side surface of said grip inner by engaging-locking means on said grip inner; and fasteners on said grip inner adapted to attach said door lining to the door panel, and covered with said grip outer.

2. A door grip structure for a vehicle with a door panel, comprising:

a door lining adapted to cover an interior-side surface of the door panel and having a grip inner molded as a unitary body with said door lining;

a grip outer fixed to an interior-side surface of said grip inner by engaging locking means on said grip inner; and fastening means on said grip inner adapted to fix said door lining to the door panel, said fastening means being covered with said grip outer.

\* \* \* \* \*